Figure 1:
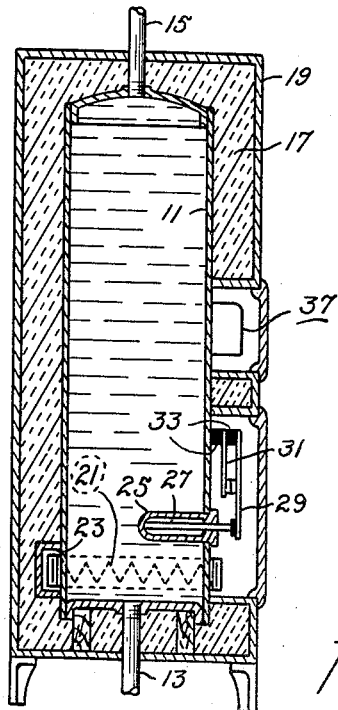

Jan. 8, 1946.  C. M. OSTERHELD  2,392,498
THERMAL RETARDER
Filed March 22, 1944

INVENTOR.
CLARK M. OSTERHELD
BY
ATTORNEY

Patented Jan. 8, 1946

2,392,498

UNITED STATES PATENT OFFICE 2,392,498

THERMAL RETARDER

Clark M. Osterheld, Stoughton, Wis., assignor to McGraw Electric Company, Elgin, Ill., a corporation of Delaware Application March 22, 1944, Serial No. 527,582

14 Claims. (Cl. 219—39)

My invention relates to electric heating and particularly to control means therefor.

An object of my invention is to provide a relatively simple form of thermal retarder heater control switch adapted to cause energization of an electric heater of a domestic hot water tank either immediately or with a predetermined time period of delay in accordance with the amount of hot water withdrawn from the tank.

Another object of my invention is to provide a relatively simple and inexpensive thermal retarder heater control switch unit adapted to cause energization of the electric heater of a hot water tank with a predetermined time period of delay in case of use of only a relatively small amount of hot water from the tank to bring the time of energization into the periods of relatively small loads on the electric supply circuit.

Other objects of my invention will either be apparent from a description of a device embodying my invention or will be pointed out in the course of such description and be set forth in the appended claims.

Figure 2:
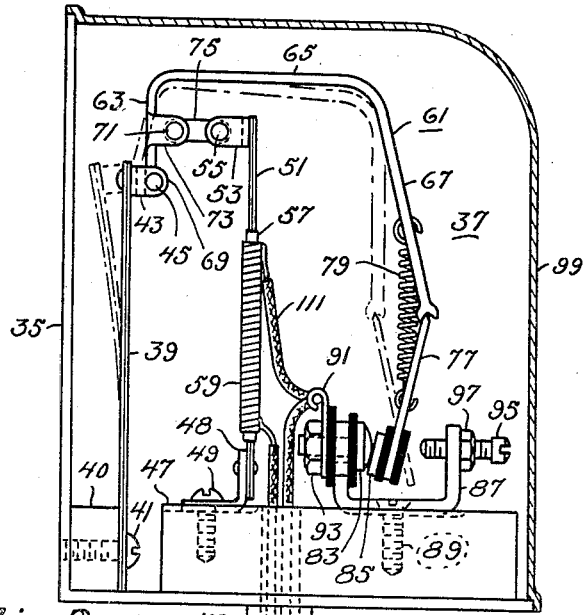
Figure 3:
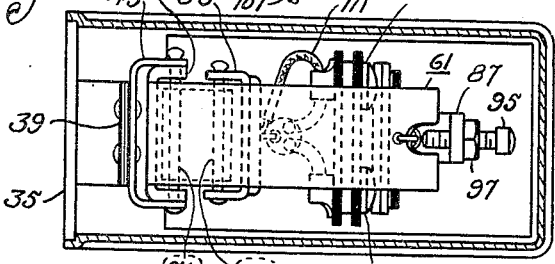
Figure 4:
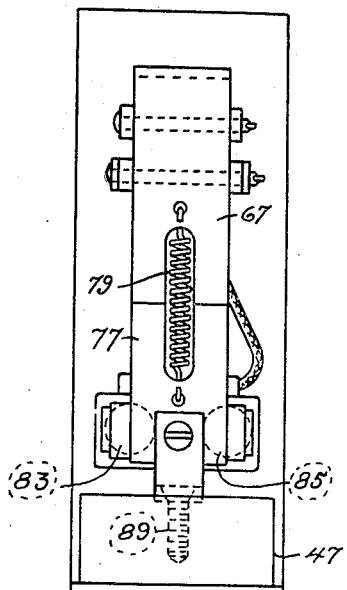
Figure 5:
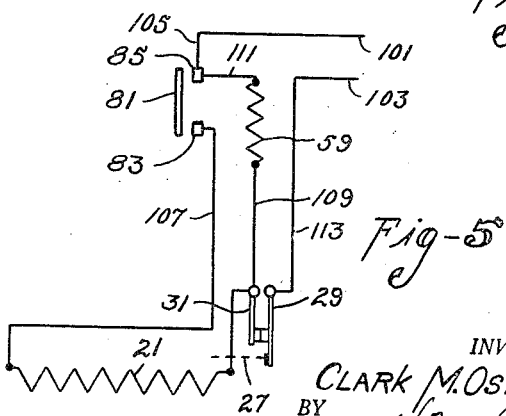

In the drawing:

Figure 1 is a vertical sectional view of a domestic hot water tank, having associated therewith a device embodying my invention, Fig. 2 is a view in side elevation thereof with the casing shown in section, Fig. 3 is a top plan view thereof, Fig. 4 is a view in front elevation thereof, and Fig. 5 is a diagram of connections.

Referring first of all to Fig. 1 of the drawing, I have there shown a domestic hot water tank 11 having a lower cold water inlet pipe 13, an upper hot water outlet pipe 15, heat insulation 17, such as rock wool around the tank 11, the heat insulation 17 being held in proper operative position by an outer casing 19.

I provide preferably, but not necessarily, a single electric heater 21 positioned at the lower end of the tank 11 and located in a tunnel 23. As shown in Fig. 1, the electric heater 21 is a clamp-on heater, although I do not desire to be limited thereto.

I provide a lower thermally-actuable heater control switch including a tubular member 25 having a closed inner end and having its open outer end secured in an opening in tank 11 near the lower end thereof in a fluid-tight manner. Within the tubular member 25 I provide an expansion rod 27 adapted to engage with and be disengaged from a resilient contact arm 29 which is adapted to engage with and be disengaged from a rigid contact arm 31, the two contact arms being supported as by blocks 33 of electric-insulating material on the tank 11. While I have shown and described a particular form of thermally-actuable heater control switch positioned at the lower end of tank 11, I do not desire to be limited thereto, since other equivalent forms of heater control switches may be used instead.

Referring now to Figs. 2, 3 and 4 I have there shown the device embodying my invention as comprising a casing 35 of heat-conducting material adapted to contain a thermal retarder heater control switch unit designated in its entirety by numeral 37. The casing 35, while shown as having a level rear surface, is adapted to be mounted on the tank 11 in heat-receiving relation thereto at substantially the mid-portion of tank 11. Since the tank 11 has an arcuate outer surface, I may employ an intermediate support of heat-conducting metal or alloy.

The thermal retarder unit includes a first high-expansion bimetal bar 39 having its lower end portion thereof secured to a supporting block 40 suitably secured to the rear wall of casing 35 as by one or several short machine screws 41 extending through the lower portion of the bimetal bar 39. At the upper free end of bar 39 I provide a bracket 43 of substantially channel-shape adapted to have a pivot pin 45 extending therethrough.

I provide a block 47 of heat and electric-insulating material suitably secured against say the bottom wall of casing 35 and adapted to have mounted thereon a bracket 48, of L-shape, held by a screw 49, to which bracket is secured the lower end of a second bimetal bar 51. The second bimetal bar 51 has a thermal expansivity on the order of one-half that of bar 39, which result may be obtained by making the thickness of the first bimetal bar 39 on the order of .025", while the thickness of the second bimetal bar 51 may be on the order of .070", or by making the bar 51 of lesser thermally-responsive material. The upper free end of bar 51 has mounted thereon a bracket 53 of channel shape in section adapted to have a pivot pin 55 extend through the parallel end portions thereof. I provide electric-insulating material 57 around the greater length of bimetal bar 51 and position thereon a heating coil 59, the wattage input whereof is on the order of only a few watts.

A switch actuable by the two bimetal bars 39 and 51 when in operation includes a first upper toggle arm 61, which toggle arm includes a first substantially vertically extending end portion 63, then an integral substantially horizontally extending portion 65 and a third substantially vertically extending portion 67. The portion 63 is provided with an enlarged lower end 69 having an opening therein through which pin 45 is adapted to extend. I provide another pivot pin 71 extending through lateral lugs 73 on portion 63, which pivot rod is adapted to extend through one end of a connector 75, the other end of which has pin 55 extending therethrough. A second or lower toggle arm 77 has pivotal engagement with the lower recessed end of part 67 of the upper toggle arm 61 and an over-center spring has its upper portion located in an elongated recess in part 67 and its upper end connected to part 67 while its lower end portion is positioned in an elongated recess in arm 77, the lower end portion of spring 79 engaging the arm 77 at the end of the recess.

A contact bridging member 81 is insulatedly mounted on the lower end of the second toggle arm 77 and is adapted to engage with a pair of contact members 83 and 85 which are insulatedly supported by a bracket 87 of generally channel shape in section secured to the upper surface of block 47 as by screws 89. Terminal connectors 91 are insulatedly supported against the inner end portion of bracket 87 as by nuts 93 engaging the body portion of the contact members 83 and 85. A stop means for the lower toggle arm 77 includes a stop screw 95 having screw threaded engagement with the outer end portion of member 87, a lock nut 97 being provided to hold the stop screw 95 in a given position. A cover 99 is provided for the casing 35 and may be held in proper operative position thereon by any suitable or desired means.

Referring now to Fig. 5 of the drawing, I have there shown a diagram of connections used in and with my improved heater control system. A pair of continuously energized supply circuit conductors 101 and 103 are provided, supply circuit conductor 101 being connected by a conductor 105 with contact terminal 85. The other contact terminal 83 is connected by a conductor 107 with one terminal of heater 21, the other terminal of which is connected to the substantially rigid contact arm 31. A conductor 109 connects the rigid contact arm 31 with one terminal of heating coil 59, the other terminal of which is connected by a conductor 111 to contact 85. Resilient contact arm 29 is connected to supply circuit conductor 103 by a conductor 113.

It may be here pointed out that the temperature of the first bimetal bar 39 will be subject to that of the water in the tank 11. When cold water is referred to, water at a temperature of 65° or 70° F. is meant, while when reference is made to hot water, a temperature of 150° F. or slightly higher is meant. The temperature of the first high expansion bimetal bar 39 will therefore have a range of from 65° F. to 150° F. and is designed, constructed, and adjusted to be substantially straight at 65° F. or 70° F., as shown in full lines in Fig. 2, and will be flexed to substantially the position shown in broken lines in Fig. 2 when its temperature is on the order of 150° F. When the second bimetal bar 51 is at a temperature of 65° to 70° F., it will be substantially straight, as shown in full lines in Fig. 2, and will flex in a counterclockwise direction when heated. Since its thermal expansivity is only one-half as much as that of bar 39, its temperature must be raised to a value on the order of 300° F. before its free end will have moved through as great a distance as did the free end of bimetal bar 39 when the latter was heated to a temperature of 150° F. This heating is effected by the heating coil 59 and will require a length of time on the order of five to six hours. When the temperature of the two bimetal bars is at ordinary room value (65° F. to 70° F.) the switch controlled thereby will be closed; when the temperature of the two bars is at 150° F., the switch will be open; and when the temperature of the first bar is 150° F. and the temperature of the second bar is 300° F., the switch will be closed.

Let is now be assumed that the tank is first filled with cold water, with the result that the lower thermally-actuable heater control switch is in closed position and also that the thermal retarder heater control switch will also be in closed position, as shown by the full lines in Fig. 2. Since these two switches are connected in series circuit relation relatively to each other and to the electric heater, the electric heater will be energized. Since the lower thermally-actuable heater control switch controls the energization of the heating coil 59, this heating coil will be energized, causing temperature rise of the second bimetal bar 51. As was hereinbefore stated, the amount of electric energy translated into heat in heating coil 59 is relatively small, and it may take six hours to cause the maximum operative temperature rise of the second bimetal bar 51 to occur.

When starting with a tank entirely filled with cold water, the temperature of the water is quite uniform from top to bottom of the tank during the heating-up period so that the temperature rise of the water from 70° F. to 150° F. will be accompanied by a similar rise in temperature of bimetal bar 39. The energized coil 59 will also cause a temperature rise of the second bimetal bar 51, and if it requires say six hours to heat all of the water in the tank to 150° F., the switch will remain closed during the entire time, and deenergization of the heater 21 will be effected by the lower thermally-actuable switch when it is subject to hot water. This deenergization of the control system will also deenergize the heating coil 59, with the result that the toggle arm 77 will move to its open position, remaining in such position until a change of temperature conditions of the thermal switch occurs.

Let it now be assumed that a predetermined amount of hot water is withdrawn from the tank, this amount being sufficient to cause subjection of tubular member 25 to cold water. The attendant closure of the lower thermally-actuable switch will effect energization of the heating coil 59 with attendant temperature rise of the second bimetal bar, which bar will reach its maximum operative temperature in from say four to six hours, whereupon the thermal retarder heater control switch will again be moved into closed, heater-energizing position. Reenergization of heater 21 will therefore take place and will continue until all of the water is again hot.

Let it now be assumed that a greater amount of hot water was withdrawn from the tank so that the amount of cold water entering the tank is sufficient to affect the thermal retarder switch unit mounted at substantially the mid-height of the tank, with attendant quick closure of the switch controlled by the thermal retarder and reenergization of heater 21 and of heating coil 59. Energization of heater 21 will continue until the dividing line between the hot and the cold water will have been moved down below the thermal retarder, when the thermal retarder switch will be opened to deenergize the heater 21. After a period of time sufficient to heat the second bimetal bar 51 to its maximum operating value, the thermal retarder switch will again be closed, energization of heat 21 will again be effected and will be continued until substantially all of the water in the tank is hot, when the lower thermally-actuable switch will be opened.

The thermal retarder embodying my invention is therefore effective to ensure that there shall be available at all times at least a half tankful of hot water. In case the tank contains only a small amount of cold water, say a quarter tankful, because of use of hot water in the early morning or late afternoon and early evening hours, energization of the heater will be delayed until the off-peak periods of early afternoon and late night hours.

It is evident that if a predetermined amount of cold water enters the tank, just sufficient to affect only the lower thermal heater control switch, reenergization of the electric heater will take place with a predetermined time delay period, which may be varied either by means of an adjustable rheostat in the circuit of the heating coil or by use of different heating coils, which time period of delay is preferably on the order of four to six hours. In case substantially one-half of the hot water in the tank is withdrawn, so that the thermal retarder switch is subject to cold water, energization of the heater will be started at once, as hereinbefore set forth.

Various modifications may be made in the device embodying my invention, and all such modifications clearly coming within the scope of the appended claims shall be considered as being covered thereby.

I claim as my invention:

1. A thermal retarder switch unit for hot water storage heaters comprising two normally straight bimetal bars and a switch operated by change in relative thermal condition of the two bars, one of said bars being subject to heat exchange with water in the tank and means independent of the tank and of the position of said switch for exchanging heat with the other bar.

2. A thermal retarder switch unit for hot water storage heaters comprising a switch lever and two bimetal bars acting mechanically upon the switch lever at different points, one of said bars being subject to heat exchange with water in the tank and the other being subject to heat independent of the tank and of the position of said switch lever.

3. A thermal retarder switch unit for hot water storage heaters comprising a switch lever and two bimetal bars acting mechanically on the switch lever at spaced points, means for thermally connecting one of said bars with the tank for heat exchange with the tank water, and means for heating the other bar directly independent of the tank water and of the position of said switch lever.

4. A thermal retarder switch unit for hot water storage tank heaters comprising a switch lever, two bimetal bars of different thermal expansivities acting mechanically on said switch lever at different points, means for thermally connecting one of said bars with tank water and electric means for heating the other bar independent of the position of said switch lever.

5. A thermal retarder switch unit for hot water storage tank heaters comprising a switch lever, two bimetal bars of different thermal expansivities acting on said switch lever at different points, means for thermally connecting the bar of greater thermal expansivity with tank water and means for heating the other bar directly independently of tank water and of the position of said switch lever.

6. In a thermal retarder switch unit for a hot water storage tank heater, a switch arm and two actuating devices therefor, each comprising a bimetal bar acting mechanically on the arm at a different point than the other, means for connecting one of said bars for heat exchange with water in the tank and independent means for changing the temperature of the other bar irrespective of the position of said switch arm.

7. A thermal retarder switch unit for a hot water storage tank heater comprising a switch arm, two bimetal bars of different thermal expansivities pivotally supporting and acting on said switch arm at spaced points, means for connecting one of said bars for heat exchange with water in the tank and independent means for changing the temperature of the other bar irrespective of the position of said switch arm.

8. A thermal retarder switch unit for hot water storage tank heaters comprising a switch lever, two bimetal bars of different thermal expansivities acting on said switch lever at different points, means for thermally connecting the bar of greater thermal expansivity with tank water and means for heating the other bar directly independent of tank water, said switch lever being adapted to be in closed position when both bars are at ordinary room temperature, to be in open position when the bar of greater thermal expansivity is at a temperature on the order of 150° F. and the second bar is at ordinary room temperature and to be in closed position when said bar of greater thermal expansivity is at a temperature on the order of 150° F. and said second bar is at a temperature on the order of 300° F.

9. A thermal retarder switch unit for a hot water storage tank heater comprising a first bimetal bar of high thermal expansivity, a second bimetal bar of lower thermal expansivity, a heat-conducting support for said two bars to hold them at one end thereof and extending substantially parallel to each other, said support being adapted to be mounted on a tank in heat conducting relation therewith, an electric heating coil for said second bar and a switch arm pivotally engaged by said two bars at two different points and adapted to be moved into circuit closing position when both bars are at ordinary room temperature, to be moved into open circuit position when said first bar is subject to hot water in the tank and said heating coil has been energized for less than a predetermined length of time and to be moved into closed position when said first bar is subject to hot water in the tank and said heating coil for said second bar has been energized for at least a predetermined length of time.

10. A thermal retarder heater control switch unit for a heater of a hot water tank, comprising a high expansion bimetal bar adapted to be mounted in heat-conducting relation to the tank, a low-expansion bimetal bar, a heating coil for said low-expansion bar and a heater control switch actuable jointly by said two bimetal bars into closed position when said high expansion bar is subject to cold water in the tank and said heating coil has been energized for less than a predetermined length of time, to be moved into open position when said high-expansion bar is subject to hot water and said heating coil has been energized for less than a predetermined length of time and to be moved into closed position with a predetermined time delay period when said high-expansion bar is subject to the temperature of hot water and said heating coil has been energized.

11. A thermal retarder heater control switch unit for a heater of a hot water tank, comprising a high expansion bimetal bar adapted to be mounted in heat-conducting relation to the tank, a low-expansion bimetal bar, a heating coil for said low-expansion bar and a heater control switch actuable jointly by said two bimetal bars into closed position when said high expansion bar is subject to cold water in the tank and said heating coil has been energized for less than a predetermined length of time, to be moved into open position when said high expansion bar is subject to hot water and said heating coil has been energized for less than a predetermined length of time and to be moved into closed position with a predetermined time delay period when said high expansion bar is subject to the temperature of hot water in the tank and said heating coil has raised the temperature of said low expansion bar to a predetermined value higher than that of said high expansion bar.

12. A thermal retarder switch unit for controlling the energization of an electric heater circuit for a hot water tank, comprising a switch, a high-expansion bimetal bar adapted to be thermally connected with the tank for heat exchange with the water in the tank, a low-expansion bimetal bar and an electric heating coil for said low expansion bar energizable by power from said circuit for heating said low-expansion bar irrespective of the position of said switch.

13. A water heater control system for a domestic hot water tank having an electric heater, comprising a thermally-actuable switch adapted to deenergize said heater when substantially all of the water in the tank is hot and a bimetal thermal retarder switch mounted on the tank between the ends thereof and comprising a pair of dissimilarly thermally-actuable elements to prevent energization of said heater until after elapse of a predetermined length of time after entry of a predetermined relatively small quantity of cold water into the tank.

14. A thermal retarder switch unit for hot water storage tank heaters comprising a switch lever, two bimetal bars of different thermal expansivities acting on said switch lever at different points, means for thermally connecting the bar of greater thermal expansivity with tank water and means for heating the other bar directly independent of tank water, said switch lever being adapted to be in open position when both bars are at substantially the temperature of about 150° F. and to be in closed position when the bar of greater thermal expansivity is at a temperature of 150° F. and the other bar is at an appreciably higher temperature.

CLARK M. OSTERHELD.